United States Patent
Hasson et al.

(10) Patent No.: US 8,124,705 B2
(45) Date of Patent: Feb. 28, 2012

(54) MACRO-DIACRYLATES AND MACRO-POLACRYLATES

(75) Inventors: Ali Abdullah Tareq Hasson, Aachen (DE); Dagmar Boltersdorf, Kreuzau (DE); Ralf Werner Schmidt, Aachen (DE); Maurice Cosemans, Heinsberg (DE)

(73) Assignee: Helmholtz-Zentrum Geesthacht Zentrum Fuer Material- und Kuestenforschung GmbH, Geesthacht (DE)

( * ) Notice: Subject to any disclaimer, the term of this patent is extended or adjusted under 35 U.S.C. 154(b) by 799 days.

(21) Appl. No.: 12/158,921

(22) PCT Filed: Dec. 22, 2006

(86) PCT No.: PCT/IB2006/004196
§ 371 (c)(1),
(2), (4) Date: Sep. 23, 2008

(87) PCT Pub. No.: WO2007/096708
PCT Pub. Date: Aug. 30, 2007

(65) Prior Publication Data
US 2009/0227754 A1    Sep. 10, 2009

(30) Foreign Application Priority Data
Dec. 22, 2005  (EP) ..................... 05028119

(51) Int. Cl.
*C08F 20/34* (2006.01)
*A61F 2/02* (2006.01)
(52) U.S. Cl. .............. 526/311; 526/318.44; 623/11.11
(58) Field of Classification Search ............. 526/311, 526/318.44; 623/11.11
See application file for complete search history.

(56) References Cited

U.S. PATENT DOCUMENTS

| 5,945,463 A | * | 8/1999 | Kawabuchi et al. | 522/96 |
| 6,165,408 A | | 12/2000 | Steinmann et al. | |
| 6,225,367 B1 | * | 5/2001 | Chaouk et al. | 521/149 |
| 2005/0100579 A1 | * | 5/2005 | Lai et al. | 424/423 |

FOREIGN PATENT DOCUMENTS

WO    WO 02/39148 A1    5/2002

OTHER PUBLICATIONS

Oct. 15, 2007, PCT/IB2006/004196 International Search Report.

* cited by examiner

*Primary Examiner* — Michael M Bernshteyn
(74) *Attorney, Agent, or Firm* — Sughrue Mion, PLLC

(57) ABSTRACT

The invention relates to covalent polymer networks composed of macro-diacrylates and polyacrylates having shape memory properties and that can be used in medical technology.

13 Claims, No Drawings

MACRO-DIACRYLATES AND MACRO-POLACRYLATES

CROSS REFERENCE TO RELATED APPLICATIONS

This application claims priority under 35 U.S.C. §371 to International Application No. PCT/IB2006/004196 (filed Dec. 22, 2006) which claims priority to European Application No. EP 05028119.5 (filed Dec. 22, 2005), each of which application are expressly incorporated herein by reference in their entirety.

BACKGROUND OF THE INVENTION

1. Field of the Invention

The invention relates to macro-diacrylates and polyacrylates for the production of a covalent polymer network with shape memory properties, the polymer networks obtainable thereof and their use.

2. Description of the Related Art

Shape memory materials are materials which change their external shape when affected by an external stimulus. The materials are by way of example capable of changing their shape in a controlled manner when the temperature increases above what is known as the switching temperature $T_{trans}$.

The shape memory effect is not a specific intrinsic property of materials (shape memory polymers ("SMPs")). Rather, it results directly from the combination of structure and morphology and from processing/programming technology.

In shape memory materials, a distinction is made between a permanent and a temporary shape. The material is first brought to its permanent shape by conventional processing methods (e.g., extrusion or injection molding). The material is then brought to its desired temporary shape and fixed. This procedure is also termed programming. It consists either in heating the specimen, forming, and a cooling procedure, or else in forming at relatively low temperature. The permanent shape is in memory, while the temporary shape is actually present. Heating of the material to a temperature higher than the transition temperature for a change of morphology (switching temperature) triggers the shape memory effect and thus leads to resumption of the permanent shape from memory.

The shape memory effect, i.e., permitting controlled shape alteration of a material via application of an external stimulus, is described, for example, in *Angew. Chem.*, 114, 2138-62 (2002).

The shape memory polymer is first brought to its permanent shape by a conventional processing method. It is then deformed to the desired temporary shape and fixed in that shape (e.g., via temperature reduction). Heating to temperatures above the switching temperature triggers the shape memory effect, and the permanent shape is resumed from memory. The permanent shape can have been stabilized via physical crosslinking or via chemical crosslinking, in particular via covalent crosslinking. The covalent polymer network can on the one hand be obtained via subsequent crosslinking of linear polymers or on the other hand via a polyreaction of difunctional monomers. In turn, the monomers can be low-molecular-weight monomers or can themselves be macromolecules (macro-monomers).

For the purposes of the invention, a macro-diacrylate is a macro-monomer having two acrylate groups and a macro-polyacrylate is a macro-monomer having at least two acrylate groups.

Covalent polymer networks with shape memory properties are mostly obtained via free-radical polymerization (e.g., of macro-diacrylates). Production of covalent polymer networks often encompasses the following three stages:
1. synthesis of macrodiols,
2. acrylation of the end groups; and
3. free-radical crosslinking of the acrylate groups.

These shape memory polymers have been known for a long time, as can be found in the published overview "Formgedächtnis-Polymere" [Shape-Memory Polymers] by A. Lendlein and S. Kelch, *Angew. Chem.*, 114, 2138-62 (2002)), which describes, inter alia, biodegradable polymer networks with shape memory via polymerization of oligo(ε-caprolactone) dimethacrylate whose average molecular weight is in the range from 2,000 to 10,000 g/mol in the presence of from 11 to 90 percent by weight of n-butyl acrylate. To prepare the oligo(ε-caprolactone) dimethacrylate, oligo(ε-caprolactone)-diol is to be functionalized with polymerizable methacrylate end groups. The macro-diacrylate described includes no urethane groups.

DE 102 17 351 B3 describes interpenetrating networks that include (i) a covalently crosslinked polymer component and (ii) a polyester-urethane component. The polyester-urethane component is not covalently crosslinked, but physically crosslinked. It derives from a macrodiol based on pentadecalactone, if appropriate together with caprolactone or from p-dioxanone, preference being given here to block polymers. The macrodiol whose average molecular weight is from approximately 1,000 to approximately 20,000 g/mol is reacted with diisocyanates to give polyesterurethanes whose molecular weights are from approximately 100,000 to approximately 250,000 g/mol. The details of preparation of the polyesterurethane component are not described. However, it clearly includes no reactive group, in particular no acrylate group.

The covalently crosslinked polymer component is obtained via crosslinking of functionalized macro-monomers. The functionalization is achieved via ethylenically unsaturated units, in particular via acrylate groups and methacrylate groups. The macro-monomers are homo- and/or copolyester diols based on caprolactone, lactide, glycolide and p-dioxanone. The hydroxyl groups are functionalized via syntheses known per se to give acrylate groups and methacrylate groups. By way of example, dimethacrylate polycaprolactone whose average molecular weight from GPC analysis is from 2,000 to 30,000 g/mol was obtained. DE 102 17 351 B3 includes no specific statements concerning preparation of the macro-diacrylates, though they include absolutely no urethane groups.

DE 699 17 224 T2 likewise describes biodegradable polymer compositions with shape memory characteristics, where the polymer includes either hard and soft segments (variant 1) or one or more soft segments which have been covalently or ionically crosslinked with one another (variant 2) or polymer mixtures (variant 3).

A copolyesterurethane is stated as an example of the polymer composition having hard and soft segments. This multi-block copolymer was prepared via reaction of a diisocyanate (e.g., of TMDI) in 1,2-dichloroethane at 80° C. in at least ten days with two different macrodiols via precipitation in hexane, and purified via repeated dissolution in 1,2-dichloroethane and precipitation in hexane. The macrodiols were a poly(6-caprolactone)-diol (i.e., the soft segment) and a α,ω-dihydroxy[oligo(L-lactate-co-glycolate)ethylene-oligo(L-lactate-co-glycolate)] (i.e., the hard segment). Although nothing is said about the end groups, the polyesterurethane includes no reactive groups, such as acrylate groups. As an example of covalent crosslinking, the synthesis of the macromonomer from a polydiol and methacryloyl chloride is described. For this reaction, the following detailed steps in a process are needed:
(i) Methacryloyl chloride is added dropwise at 0° C. to a solution of poly (ε-caprolactone)-diol and triethylamin in tetrahydrofuran (THF);
(ii) The reaction mixture was stirred at 0° C. for three days, and the precipitated salt was filtered off;
(iii) Once the mixture had been concentrated at room temperature under reduced pressure, ethyl acetate is added and the mixture is again filtered;
(iv) Finally, the product was precipitated with a ten-fold excess of a mixture of n-hexane, diethyl ether and methanol;
(v) The colorless precipitate was collected, dissolved in dichloroethane and again precipitated; and
(vi) Finally, the poly(ε-caprolactone) dimethacrylate was carefully dried at room temperature under reduced pressure.

That process gives macro-monomers whose average molecular weights are from 4,500 to 10,000 g/mol. That type of preparation process for a macro-diacrylate is very complicated in terms of time (more than three days) and environmental factors (many purification steps with large amounts of solvents). The resultant macro-diacrylate clearly comprises absolutely no urethane groups. The obtained polymer mixture (variant 3) is mixture of thermoplastic polymers with the same basis structure. Nothing is said about reactive groups, and certainly nothing about acrylate groups.

DE 102 17 351 B3 describes polyesterurethanes which can exhibit shape memory effects. The macrodiol derived from polypentadecalactone whose average molecular weight is from 1,000 to 20,000 g/mol is reacted with conventional diisocyanates, preferably with trimethylhexane 1,6-diisocyanate (TMDI) to give corresponding polyesterurethanes whose molecular weight is in the range from 50,000 to 250,000 g/mol. The reaction takes place at 80° C. with stannous ethylhexanoate used as catalyst and 1,2-dichloroethane as solvent in an average of two days. Although nothing is said about the end groups, these are unreactive end groups and, in particular, not acrylate groups.

DE 692 21 128 T3 describes a mixture of isocyanate-terminated polyurethanes (polyurethane prepolymer). This reaction product is derived from an amorphous polyester polyol and from a polyisocyanate, in particular a diisocyanate. It is used together with a semicrystalline polyurethane derived from a polyester diol and a polyisocyanate, and with a prepolymer derived from a poly(tetramethylene ether) glycol and a polyisocyanate. This polymer mixture features good adhesion on metal substrates and polymer substrates and is therefore intended to be used as a hot-melt adhesive, as a coating and/or as a sealant. This polymer mixture is intended inter alia for use in adhesive bonding of polysubstrates because it has improved creep strength. Its use as an actual shape memory polymer is not described. The isocyanate prepolymers include no acrylate groups.

In view of the foregoing, the object of the invention includes providing novel covalent networks whose monomers can, with a view to both technical and economic factors, be rapidly prepared and easily purified. The intention is that the switching temperatures, the mechanical properties, and the degradation behavior of such networks be capable of controlled adjustment via variation of the composition, without resultant loss of the shape memory properties. If possible, the covalent polymer network should also be biodegradable.

Novel macro-diacrylates and polyacrylates usable for the production of covalent polymer networks with shape memory properties have been found, and are characterized in that they include both carboxylic ester structural units and urethane structural units.

The macro-polyacrylates of the invention include at least approximately 2 acrylate groups, preferably approximately 2, 3, 4, 5, 6, 7, 8, 9 or 10 and more preferably approximately 2, 3 or 4 acrylate groups.

For the purposes of the invention, preferred macro-diacrylates and preferred macro-polyacrylates that include macro-diacrylates have the general Formula (I):

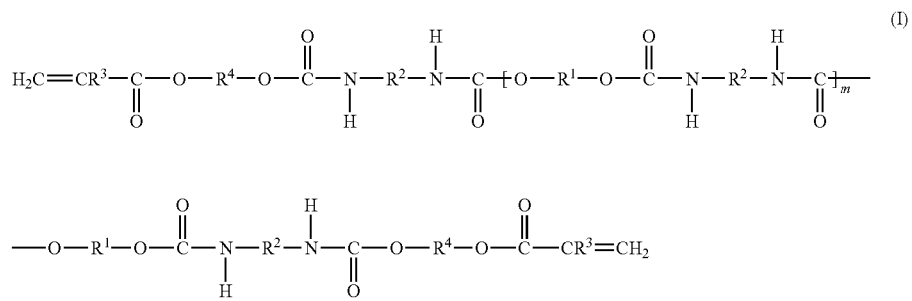

in which $R^1$ is a substituent of a macrodiol, $R^2$ is at least one of a substituent of a low-molecular-weight diisocyanate or of a diisocyanate prepolymer with a number-average molecular weight $M_n$ in the range from approximately 500 to approximately 3,000 g/mol, $R^3$ is at least one of a hydrogen or a lower alkyl, $R^4$ is at least one of a branched or unbranched alkylene group having from approximately 2 to approximately 10 carbon atoms and m is 0 or an integer in the range from approximately 1 to approximately 10.

For the purposes of the invention, preference is also given to macro-polyacrylates of the following general Formula (II):

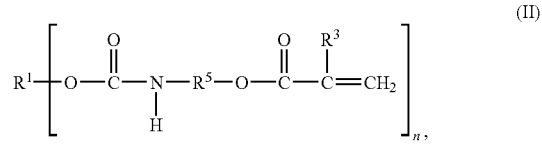

and in particular to macro-diacrylates of the following general Formula (IIa):

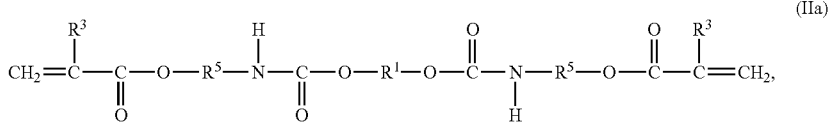

(IIa)

in which $R^1$ is a substituent of a macro-polyol, $R^3$ is at least one of a hydrogen or lower alkyl, $R^5$ is at least one of a branched or unbranched alkylene group having from approximately 2 to approximately 10 carbon atoms, and n is 2 or an integer greater than 2.

As macro-diols and polyols, polyester diols and polyols, polyether diols and polyols or polycarbonate diols and polyols are preferred. The macro-diols and polyols of the invention include at least approximately two hydroxy groups, preferably approximately 2, 3, 4, 5, 6, 7, 8, 9 or 10 and more preferably approximately 2, 3 or 4 hydroxy groups. As an example, macro-polyols with 2 hydroxy groups are also called macrodiols, such with 3 hydroxy groups macrotriols, such with 4 hydroxy groups macrotetroles, etc.

The preferred polyester diols and polyols are prepared by ring opening polymerization of cyclic lactones usually using an initiating compound or by polycondensation of polycarboxylic acid, polyhydroxycarboxylic acid, hydroxy polycarboxylic acid, or polyhydroxy polycarboxylic acid and polyhydroxy compound. In the case of polyhydroxycarboxylic acid, hydroxy polycarboxylic acid, or polyhydroxy polycarboxylic acid the polycondensation can also be performed between molecules of the same structure and/or the polycarboxylic acid and/or the polyhydroxy compound.

The functionality (valency) of the initiating compound, polycarboxylic acid, hydroxy polycarboxylic acid, polyhydroxy polycarboxylic acid, polyhydroxy carboxylic acid and polyhydroxy compound is selected by considerations that are obvious to a person skilled in the art to get the desired polyester polyol, e.g. polyester diol, triol, tetrol, etc.

As cyclic lactones for the ring opening polymerization ε-caprolactone, diglycolide, dilactide (LL-, DL-, LL/DL- or rac-dilactide), p-dioxanone, ω-pentadecanolactone, butyrolactone (β, γ-butyrolactone) or their mixtures are used. Preferred are ε-caprolactone, diglycolide, dilactide (LL-, DL-, LL/DL- or rac-dilactide) or their mixtures.

The polyester diols which are synthesized by polycondensation have an average hydroxyl functionality of at least about 1.9, are well known to the art and are prepared conventionally using an excess of the diol to provide hydroxyl termination. The other polyester polyols useful for the present invention can be prepared accordingly by known means.

Examples of the polycarboxylic acid, dicarboxylic acids, but also carboxylic acids of higher functionality (valency; e.g., tricarboxylic acids, tetracarboxylic acids, etc.), and the ester-forming derivatives or anhydride or mixtures of any two or more of these acids thereof include succinic acid, glutaric acid, adipic acid, azelaic acid, sebacic acid, pimelic acid, suberic acid, dodecanedicarboxylic acid, terephthalic acid, isophthalic acid, orthophthalic acid, phthalic acid, p-hydroxybenzoic acid, 1,2,3-propane tricarboxylic acid, and benzene -1,2,3-tricarboxylic acid (hemimellitic acid).

Examples for polyhydroxycarboxylic acid, hydroxy polycarboxylic acid and polyhydroxy polycarboxylic acid compounds that can be used for the invention include 3,4,5-trihydroxy benzoic acid (gallic acid), 2-hydroxy-nonadecan-1,2,3-tricarboxylic acid (agaricin acid), citric acid, hydroxy succinic acid, and dihydroxy succinic acid.

Examples of the polyhydroxy compound (i.e., polyols like diols, triols, tetrols, pentols, hexols, etc.), include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, polycarbonate diol, bisphenol-A-ethylene glycol, diethylene glycol, triethylene glycol, polyethylene glycol, polypropylene glycol, polytetramethylene glycol, polytetramethyleneoxide glycol, dimethylolpropionic acid, glycerine, 1,1,1-tris(hydroxymethyl)ethane (trimethylol ethane), 1,1,1-tris (hydroxymethyl) propane (trimethylol propane), [2,2-bis (hydroxymethyl)-1,3-propandiol (pentaerythrite, pentaerythritol), sugars (polyhydroxy aldehydes or polyhydroxy ketones) or sugar alcohols (reduced sugars), as well as ethoxylated derivatives of the polyols.

Examples of an initiating compound for the above described ring opening polymerization (i.e., a polyhydroxy compound, such as those mentioned above, but also other initiators that are known in the art) include polyamines or polymercaptanes or compounds which include a total of at least two groups selected from hydroxy, amino and mercapto groups.

Preferred polyester polyols and diols include: polycaprolactone polyol, poly -(ε-caprolactone-co-glycolide)-polyol, poly-(ε-caprolactone-co-lactide)-polyol, poly-(lactide-co-glycolide)-polyol, polypentadecalactone polyol, poly-(ε-caprolactone-co-pentadecalactone)-polyol, poly-(1,6-hexamethylene-adipate) polyol, poly-(1,6-hexamethylene-sebacate)-polyol, poly-(1,10-decamethylene-sebacate)-polyol, polycaprolactone diol, poly-(ε-caprolactone-co-glycolide)-diol, poly-(ε-caprolactone-co-lactide)-diol, poly-(lactide-co-glycolide)-diol, polypentadecalactone diol, poly-(ε-caprolactone-co-pentadecalactone)-diol, poly-(1,6-hexamethylene-adipate) diol, poly-(1,6-hexamethylene-sebacate)-diol, poly-(1,10-decamethylene-sebacate)-diol and the respectice triols, tetrols, pentols, hexols, etc.

Examples of the macrodiols include polyether diols such as polyoxyethylene glycol, polyoxypropylene glycol and polyoxytetramethylene glycol.

Examples of the macrodiols include polycarbonate diols such as a commercially available aliphatic polycarbonate ether diol (Desmophen® C2200) and length extended aliphatic polycarbonate ether diol with polycarboxylic acid or derivatives with diisocyanate.

Examples of the macro-polyols, in particular the macrodiols, include polyether ester block copolymers such as poly-(caprolactone-b-ethylene glycol-b-caprolactone) triblock copolymer, poly-(ω-pentadecanolactone-b-ethylene glycol-b-ω-pentadecanolactone) triblock copolymer, poly-(ll-lactide-b-ethylene glycol-b-ll-lactide) triblock copolymer, poly-(dl-Lactide-b-ethylene glycol-b-dl-lactide) triblock copolymer, poly-(caprolactone-b-pentadecalactone-b-caprolactone) triblock copolymer, poly-(propylene glycol-b-ethylene glycol-b-propylene glycol) triblock copolymer.

The preferred macro-diold and polyols, in particular the macrodiols, have an average molecular weight ranging from about 1,000 to 50,000 and more preferably from about 3,000 to 30,000 and most preferably 5,000 to 20,000, melting points within the range of about 20° C. to about 150° C., and more preferably within the range of about 30° C. to about 100° C., a hydroxyl functionality of 2 and acid number below 3 mg KOH/gram.

The urethane acrylate end groups, as for example the preferred $CH_2=CR^3$—CO—O—$R^4$—O—CO—NH—$R^2$—NH—CO— end groups, have been obtained in the first step via an addition reaction of an OH group of a macrodiol to an isocyanate group of a diisocyanate and in the second step of the process via an addition reaction of an OH group of a hydroxylated acrylate compound, preferably a hydroxyalkyl (meth)acrylate, to the other isocyanate group.

In the simplest case, the macro-diols and polyols, in particular the macrodiol, can be composed of a homo- or copolymer or block copolymer. The macropolyol can comprise urethane groups or comprise no urethane groups. In this case, it is thus possible with a single component to program a system with two temporary shapes, as described in DE 102 17 351 B3 for a polymer mixture.

Lower alkyl ($R^3$) is generally a straight-chain or branched hydrocarbon substituent having from approximately 1 to approximately 4 carbon atoms.

The hydroxylated acrylate compound in the invention (see, e.g., the compound of Formula (VI) in the following) may preferably be a hydroxyalkyl acrylate wherein the carbon number of the alkyl group moiety is from approximately 1 to approximately 10, particularly preferably is a hydroxyalkyl acrylate wherein the carbon number of the alkyl group moiety is from approximately 1 to approximately 5. Particularly preferred among them is a hydroxyalkyl (meth)acrylate. Specifically, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, pentandiol mono(meth)acrylate or hexanediol mono(meth)acrylate may, for example, be mentioned, and 2-hydroxyethyl (meth) acrylate or 2-hydroxypropyl (meth)acrylate are particularly preferred. 2-Hydroxyethyl acrylate or 2-hydroxypropyl acrylate are most preferred.

As (mono) isocyanato acrylate compounds (see, e.g., the compound of Formula (VIII)) in principle are useful for the invention, and are formally (meant in the sense of chemical structure, not necessarily in the sense of chemical synthesis) derived from the hydroxylated acrylate compound described above by replacing the hydroxy group with an isocyanato group. Preferred compounds include isocyanatoalkyl acrylates, wherein the carbon number of the alkyl group moiety is from approximately 1 to approximately 10, and particularly preferably from approximately 1 to approximately 5. Particularly preferred among them are isocyanatoalkyl (meth)acrylates. Specifically, 2-isocyanatoethyl (meth)acrylate, 2-isocyanatopropyl (meth)acrylate, 3-isocyanatopropyl (meth)acrylate, 2-isocyanatobutyl (meth)acrylate or 4-isocyanatobutyl (meth)acrylate may, for example, be mentioned, and 2-isocyanatoethyl acrylate or 2-isocyanatopropyl acrylate are particularly preferred. 2-Isocyanatoethyl (meth)acrylate or 2-isocyanatopropyl (meth)acrylate are most preferred.

The hydroxylated acrylate compounds or the isocyanato acrylate compounds usually include only one acrylate group, but can also include 2 or more acrylate groups. The isocyanato acrylate compound can preferably be 1,1-bis(acryloyloxymethyl)ethyl isocyanate, a compound that is available from Showa Denko under the tradename KarenzBEI.

As polyisocyanate, in particular as diisocyanate (see, e.g., the compound of Formula (IV) in the following), trimethylhexamethylene diisocyanate, tolylene diisocyanate, isophorone diisocyanate and lysine diisocyanate, tolylene diisocyanate, 4,4'-diphenylmethane diisocyanate, xylylene diisocyanate, hexamethylene diisocyanate, 4,4'-methylenebis(cyclohexylisocyanate), methylcyclohexane2,4-diisocyanate, methylcyclohexane-2,6-diisocyanate, 1,3-(isocyanate-methyl)cyclohexane, and isophorone diisocyanate are preferred. The polyisocyanate compounds may be used alone or in combination as a mixture of two or more of them.

For medical applications, polyisocyanates such as trimethylhexamethylene diisocyanate, tolylene diisocyanate, isophorone diisocyanate and lysine diisocyanate are most preferred.

It is also possible to use diisocyanate prepolymers whose molecular weight is greater than 500 g/mol, and in particular up to 3,000 g/mol. These polyurethane prepolymers are prepared via a known reactions of the abovementioned diisocyanates with low-molecular-weight diols or macrodiols (e.g., with oligoether diols, oligoester diols or oligocarbonate diols with MW of from 500 to 3,000 g/mol).

The preferred macro-polyol urethane acrylates, in particular the macrodiol urethane acrylates, will preferably have an average molecular weight ranging from approximately 1,000 to approximately 50,000 and more preferably from approximately 3,000 to approximately 30,000 and most preferably from approximately 5,000 to approximately 20,000, melting points within the range of approximately 20° to approximately 150° C. and more preferably within the range of approximately 30° to approximately 100° C., and an isocyanate content below approximately 5 ppm.

The first aspect of the invention provides two methods or processes for producing urethane polyacrylates as precursors for shape memory cross-linked polymers.

The first method includes reacting of the above-mentioned macrodiol with the polyisocyanate to form the isocyanate end terminated macrodiol and afterwards the end termination of the isocyanate end groups with the hydroxylated acrylate compound. By this method, a compound of general Formula (I) is obtained. In this method, the use of macropolyols with more than 2 hydroxy groups would result in undesired crosslinking in the first step.

The second method includes the end termination of the macropolyol in one step with the isocyanate group of the acrylate. By this method a compound of general Formula (II) is obtained.

The second aspect of the invention includes the curing of the macro-polyacrylate, preferably via photo-curing.

The third aspect of the invention includes the thermal and mechanical properties and the shape memory effect of these cross-linked urethane acrylates.

By the first method, a macrodiol, in particular the macrodiol (III),

H—O—$R^1$—OH             (III)

and a polyisocyanate compound, in particular the polyisocyanate compound (IV),

OCN—$R^2$—NCO             (IV)

are reacted under such a condition that the isocyanate group is stoichiometrically excessive in order to obtain an urethane prepolymer having a terminal isocyanate group, in particular prepolymer (V)

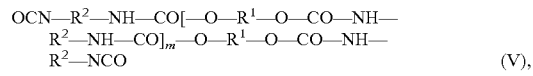

OCN—$R^2$—NH—CO[—O—$R^1$—O—CO—NH—$R^2$—NH—CO]$_m$—O—$R^1$—O—CO—NH—$R^2$—NCO             (V),

For each of (III), (IV) and (V), $R^1$ and $R^2$ are as defined above for general Formula (I). Then, the hydroxylated acrylate compound, in particular the hydroxylated (meth)acrylate compound (VI),

$$CH_2=CR^3—CO—O—R^4—OH \quad (VI)$$

is reacted to the terminal isocyanate groups of the urethane prepolymer to give a polyester polyurethane diacrylate, in particular the polyester polyurethane diacrylate of the general Formula (I). In (VI), $R^3$ and $R^4$ are as defined above for general formula (I).

The proportions of the macrodiol component (e.g., the compound of general formula (III)) and the polyisocyanate compound (e.g., the compound of general formula (IV)) is preferably from approximately 1.5:1 to approximately 2:1.

The reaction is preferably carried out at a temperature for a common urethane-modification reaction (e.g., from approximately 30° to approximately 90° C. in solvent and from approximately 100° to approximately 150° C. solvent-free in melt). At the time of the reaction, a urethane-modification catalyst such as zinc naphthenate, dibutyltin dilaurate, tin 2-ethylhexanoate, triethylamine or 1,4-diazabicyclo[2.2.2] octane, may be used. But the reaction is preferably carried out without catalyst.

The reaction of the urethane prepolymer having a terminal isocyanate group with a hydroxylated acrylate compound, in particular the hydroxylated (meth)acrylate compound (VI), is carried out preferably in such a proportion that the molar ratio of the terminal isocyanate group to the hydroxyl group will preferably be from approximately 1:1 to approximately 1:1.5. The temperature for the reaction is preferably from approximately 30° to approximately 90° C. in solvent and from approximately 100° to approximately 150° C. solvent-free in melt. At the time of the reaction, a polymerization inhibitor may be added in order to control the thermal polymerization reaction of the acryloyl group, in particular the (meth)acryloyl group. As a preferred polymerization inhibitor, hydroquinone or hydroquinone monomethyl ether, may, for example, be mentioned. Such a polymerization inhibitor is used within a range of from approximately 100 to approximately 1000 ppm relative to the hydroxylated acrylate compound, in particular the hydroxylated (meth)acrylate compound (VI).

By the second method, a macro-polyol, preferably the macro-polyol of general Formula (VII),

$$R^1(OH)_n \quad (VII)$$

in particular the macrodiol (VIIa),

$$R^1(OH)_2 \quad (VIIa)$$

and an isocyanato acrylate compound, in particular the isocyanato acrylate compound (VIII),

$$CH_2=CR^3—CO—O—R^5—NCO \quad (VIII)$$

are reacted in an one step process to give a macro-polyacrylate, in particular the macro-polyacrylate of the general formula (II) or (IIa) respectively. The proportions of the macrodiol or polyol component, in particular the macropolyol component (VII) or (VIIa), and the isocyanato acrylate compound, in particular the isocyanato acrylate compound (VIII), preferably is n: 1. In the formulae, $R^1$, $R^3$, $R^5$ and n have the same meaning as defined above for general Formula (II).

The reaction is preferably carried out at a temperature for a common urethane-modification reaction (i.e., from approximately 30° to approximately 90° C. in solvent and from approximately 100° to approximately 150° C. solvent-free in melt). At the time of the reaction, a urethane-modification catalyst such as zinc naphthenate, dibutyltin dilaurate, tin 2-ethylhexanoate, triethylamine or 1,4-diazabicyclo[2.2.2] octane, may be used. The reaction is preferably carried out, however, without catalyst. Preferred polymerization inhibitors include hydroquinone or hydroquinone monomethyl ether. Such a polymerization inhibitor is used within a range of from approximately 100 to approximately 1,000 ppm to the isocyanato acrylate compound.

The following advantages are associated with the preparation process of the invention for the macro-polyacrylate, in particular the macro-diacrylate:

1. The macro-diacrylates and polyacrylates are obtained more quickly and at lower cost;
2. It is easier to purify (less solvent);
3. The yield is higher;
4. Higher degrees of acrylation are achieved; and
5. The process (i.e., a one-pot reaction) makes it easier to increase the molecular weight of the macrodiol via reaction with the diisocyanate, and then to terminate it with diacrylate. Various macropolyols can be used together in the processes of the invention. Various switching segments can also therefore be introduced into the shape memory polymer.

The resultant covalent polymeric networks exhibit, among other things, good mechanical and thermal properties, a high degree of cross linking, good shape memory properties, a very low level of relaxation and creep effects and are biocompatible.

The cross-linking of the urethane diacrylates and polyacrylates, in particular the urethane diacrylates, take place by free-radically polymerization. The free-radically polymerization can be initiated by using a conventional chemical initiator system, such as a peroxide or a combination of a peroxide and an amine. The urethane diacrylates and polyacrylates, in particular the urethane diacrylates, are preferably initiated by using a photoinitiator, optionally combined with a suitable photosensitizer or accelerator. The photoinitiator should be capable of generating free radicals for addition polymerization at some wavelength between approximately 200 and approximately 800 nm, more preferred wavelength between approximately 250 and approximately 700 nm, most preferred wavelength between approximately 300 and approximately 500 nm. Suitable photoinitiators include, for example, alpha-diketones, monoketals of alpha-diketones or ketoaldehydes, acroleins and their corresponding ethers, chromophore-substituted halomethyl-s-triazines, chromophore-substituted halomethyl-oxadiazoles, aryliodonium salts, and other commercially available ultraviolet ("UV") and visible light photoinitiators. Preferred photoinitiator systems include, for example, a mono or diketone photoinitiator together with a suitable donor compound or accelerator. More preferred photoinitiators are Kip 150 (polyfunctional oligomeric hydroxy ketone, Lamberti Sp. A.), 1-hydroxy-cyclohexyl-phenyl-ketone, TZT (Liquid Benzophenone derivative) and D,L-champor quinone.

As thermoinitiators organic peroxides, benzoyl peroxide, lauroyl peroxide, dialkyl peroxides such as dicumyl peroxide and di-tert-butyl peroxide, peroxydicarbonates such as diisopropyl peroxydicarbonate and bis(4-tert-butylcyclohexyl) peroxydicarbonate, alkyl peresters such as tert-butyl peroxyoctoate and tert-butyl peroxybenzoate, can be used. In particular, lauroyl peroxide is preferred. Furthermore, a different kind of radical generator, for example a radical-generating azo compound such as azobisisobutyronitrile, may be used in lieu of the peroxide.

The covalently cross-linked shape memory urethane diacrylates and polyacrylates, in particular urethane diacrylates, can be semi-crystalline or amorphous and have generally switching temperatures within the range of approximately 20° to approximately 150° C. and more preferably within the range of approximately 20° to approximately 100° C. For medical application switching temperatures within the range of approximately 35° to approximately 55° are most preferred.

Due to the good thermal and mechanical properties, high shape recovery and good biocompatibility of the cross-linked urethane polyacrylate, in particular diacrylate, these materials can be used in many technical applications, preferred is the use as network precursors in medical technology.

The various embodiments of the invention having thus been generally described, several examples will hereafter be discussed to illustrate the inventive aspects more fully.

It will be apparent to those skilled in the art that various modifications and variations can be made in the present invention and specific examples provided herein without departing from the spirit or scope of the invention. Thus, it is intended that the present invention covers the modifications and variations of this invention that come within the scope of any claims and their equivalents.

SPECIFIC EXAMPLES

The following examples are for illustrative purposes only and are not intended, nor should they be interpreted to, limit the scope of the invention.

1. Preparation of a Macrodiol Urethane Methacrylate as Network Precursor

A. Method 1 (Formula I)

To 0.05 mol of dried macrodiol of Formula (III) with $R^1$ according to Table 1, 0.105 mol of 2,2,4- and 4,4,2-trimethylhexane diisocyanate (TMDI) were added, followed by a reaction at 100° C. for 3 hours in the absence of catalyst, to obtain a isocyanate termined macrodiol. To the isocyanate terminated macrodiol, 1.1 mol of 2-hydroxyethyl methacrylate were added dropwise at 100° C. in presence of 500 ppm of inhibitor. The reaction was carried out until absorption by an isocyanate group at a wavelength of 2250 $cm^{-1}$ in the infrared absorption spectrum was no longer observed in order to obtain a macrodiol urethane dimethacrylate of Formula (I).

B. Method 2 (Formula II)

To 0.05 mol of dried macrodiol of Formula (VIIa) with $R^1$ according to Table 2, 0.105 mol of isocyanatoethylmethacrylate IEM (Karenz® MOI) is added dropwise, followed by a reaction at 110° C. for 45 minutes in the absence of any catalyst. Thereafter, the reaction is carried out until absorption by an isocyanate group at a wavelength of 2250 $cm^{-1}$ in the infrared absorption spectrum is no longer observed in order to obtain a macrodiol urethane dimethacrylate of Formula (II).

2. Production of Polymer Networks with Shape-Memory Properties

The macrodiol diacrylate (macrodiol urethane dimethacrylate) was uniformly distributed on a glass plate together with the photoinitiator and heated in vacuo to between 100° C. to 140° C. for 5 to 10 minutes in order to remove gas bubbles from the melt A second glass plate was placed on the melt and secured by clamps and the two glass plates were separated with a 0.5 mm spacer.

Networks were obtained via irradiation of the melt with UV light whose wavelength was from 320 to 500 nm, at 80° C. The irradiation time was from 3 to 10 minutes. Various materials, the composition and properties of which are illustrated in Tables 1 and 2 below, were crosslinked in the melt to yield the polymer networks illustrated in Table 3.

TABLE 1

Macro Diacrylates According to Formula (I)

| Example | $R^1$ | m | $M_n$ [g/mol] (GPC) | $T_g$ [° C.] (DSC) | $T_{m1}$ [° C.] (DSC) |
|---|---|---|---|---|---|
| 1 | Oligo(ε-hydroxycaproate) | 0 | 10,000 | −57 | 55 |
| 2 | Oligo(ε-hydroxycaproate) | 0 | 6,000 | −60 | 52 |
| 3 | Oligo(ε-hydroxycaproate-co-glycolate) (90/10) | 0 | 5,000 | −50 | 43 |
| 4 | Oligo(1,6-hexanediol adipate) | 0 | 8,000 | −59 | 53 |

TABLE 2

Macro Diacrylates According to Formula (II)

| Example | $R^1$ | $M_n$ [g/mol] (GPC) | $T_g$ [° C.] (DSC) | $T_{m1}$ [° C.] (DSC) |
|---|---|---|---|---|
| 5 | Oligo(ε-hydroxycaproate) | 10,000 | −60 | 53 |
| 6 | Oligo(ε-hydroxycaproate-co-glycolate) (97/3) | 10,000 | −60 | 48 |
| 7 | Oligo(l,6-hexanediol adipate) | 8,000 | — | 55 |

The shape in which the crosslinking takes place corresponds to the permanent shape. The melt can also be crosslinked on other substrates composed of any desired materials including, for example, wires, fibers, threads, foils etc., thus giving the substrates a coating.

The other thermal and mechanical properties of the polymeric networks were also studied. The results of these studies are illustrated in Table 3 below.

TABLE 3

| Macrodiol Diacrylate Example | $T_g$ [° C.] | $T_{m1}$ [° C.] | Modulus of Elasticity at 22° C. [MPa]* | Tensile Strain at Break [22° C.; %]* | Tensile Strength [22° C.; MPa]* |
|---|---|---|---|---|---|
| 1 | −60 | 53 | 163 | 400 | 27 |
| 2 | −57 | 50 | 180 | 400 | 25 |
| 3 | −60 | 35 | 50 | 280 | 22 |
| 4 | −59 | 52 | 210 | 300 | 18 |
| 5 | −60 | 52 | 170 | 400 | 28 |
| 6 | −60 | 42 | 130 | 370 | 22 |
| 7 | −53 | 53 | 150 | 290 | 20 |

*determined via tensile tests

Cyclic thermomechanical experiments were used to determine shape memory properties (method described in *Angew. Chem.*, 114, 2138-2162 (2002)). For this, stamped-out dumbbell-shaped specimens of thickness 0.5 mm and length 30 mm and width (gauge length) of 2 mm were used.

To fix the temporary shape, the specimens were stretched by 100% above their $T_{m1}$ and cooled below $T_{m1}$ at constant stress. To trigger the shape memory effect, the specimens were heated above $T_{m1}$ under stress-free conditions. The cooling rate was 10 K/minute and the heating rate here was 1° C./minute. Table 4 below shows corresponding measurements for the inventive networks, where the study of shape memory effect was carried out at $T_{m1}$.

TABLE 4

| Macrodiol Diacrylate Example | Temperature Program [° C.] | Shape Fixing [%] | Recovery Ratio After 1st Cycle [%] | Recovery Ratio After 5 Cycles [%] |
| --- | --- | --- | --- | --- |
| 1 | 60-20-60 | 100 | 99 | 99 |
| 5 | 55-20-55 | 99 | 99 | 98 |
| 7 | 60-20-60 | 99 | 95 | 99 |

3. Preparation of a Macrotetrol Urethane Methacrylate as Network Precursor

To 5000 g (0.31 mol) of dried macrotetrol (e.g., polycaprolactone, MW 16.000 g/mol, pentaerythritol initiated), 193.8 g (1.25 mol) of isocyanato ethylmethacrylate IEM (Karenz Moi) was added dropwise at 110° C. during 0.5 hour. The reaction was carried out at 110° C. until absorption by an isocyanate group at a wavelength of 2250 cm$^{-1}$ in the infrared absorption spectrum was no longer observed in order to obtain an urethane tetramethacrylate.

4. Preparation of the Network

Photo-curing of the urethane tetramethacrylate in presence of a photo initiator was carried out in a mould formed of two glass plates and a spacer with UV-light with wavelength from 320 to 600 nm at 80° C.

Thermal and mechanical properties of the polymeric network at room temperature are illustrated in Table 5 and the shape memory properties of the polymeric network film (1 cycle) are illustrated in Table 6.

TABLE 5

| $T_g$ [° C.] | $T_{m1}$ [° C.] | Modulus of Elasticity [22° C.; MPa]* | Tensile Strain at Break [22° C.; %]* | Tensile Strength [22° C.; MPa]* |
| --- | --- | --- | --- | --- |
| −57 | 38 | 100 | 230 | 25 |

TABLE 6

| Temperature Program [° C.] | Shape Fixing [%] | Recovery Ratio After 1st Cycle [%] |
| --- | --- | --- |
| 45-20-45 | 97 | 97 |

5. Preparation of a Network Precursor Based on Tetra-Hydroxy-Poly-(Lactide-Glycolide-Caprolactone) -16 k (56/34/10)

To 2000 g (0.125 mol) of dried macrotetrol, 78.1 g (0.5 mol) of isocyanato ethylmethacrylate IEM (Karenz Moi) was added dropwise at 140° C. during 0.5 hour. The reaction was carried out at 140° C. until absorption by an isocyanate group at a wavelength of 2250 cm$^{-1}$ in the infrared absorption spectrum was no longer observed in order to obtain an urethane tetramethacrylate. The preparation of the network is done as described above.

Thermal and mechanical properties of the polymeric network at room temperature are illustrated in Table 7 and the shape memory properties of the polymeric network film (40% elongation, 1 cycle) are illustrated in Table 8.

TABLE 7

| $T_g$ [° C.] | Modulus of Elasticity [22° C.; MPa]* | Tensile Strain at Break [22° C.; %]* | Tensile Strength [22° C.; MPa]* |
| --- | --- | --- | --- |
| 42.7 | 2980 | 2.2 | 63 |

TABLE 8

| Temperature Program [° C.] | Shape Fixing [%] | Recovery Ratio After 1st Cycle [%] |
| --- | --- | --- |
| 55-20-55 | 98 | 93 |

What is claimed is:

1. A covalent polymer network with shape memory properties comprising at least one cross-linked macro-polyacrylate, wherein said macro-polyacrylate comprises at least two acrylate groups and, includes both ester structural units and urethane structural units,
wherein said macro-polyacrylate has the general Formula (I):

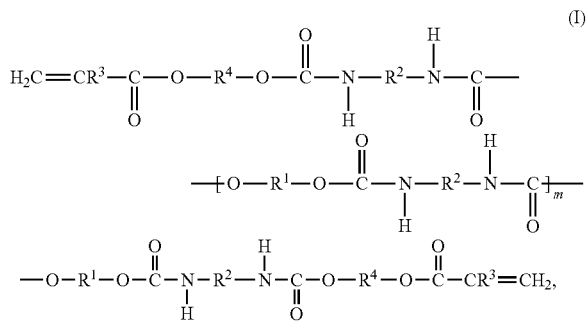

wherein $R^1$ is a substituent of a macro-diol, $R^2$ is a substituent at least one of a low-molecular-weight diisocyanate, $R^3$ is at least one of hydrogen and a branched or unbranched alkyl group having from 1 to 4 carbon atoms, $R^4$ is at least one of a branched or unbranched alkylene group having from 2 to 10 carbon atoms and m is 0 or an integer in the range from 1 to 10, or
wherein said macro-polyacrylate has the general Formula (II):

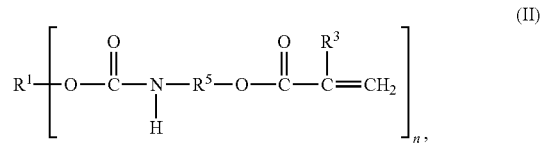

wherein $R^1$ is a substituent of a macro-polyol, $R^3$ is at least one of a hydrogen and a lower alkyl, $R^5$ is at least one of a branched or unbranched alkylene group having from 2 to 10 carbon atoms and n is an integer of 2 or greater.

2. The covalent polymer network of claim 1, wherein said macro-polyacrylate comprises 2 to 10 acrylate groups.

3. The covalent polymer network of claim 2, wherein said macro-polyacrylate comprises 2 to 4 acrylate groups.

4. The covalent polymer network of claim 3, wherein said macro-polyacrylate comprises 2 acrylate groups.

5. The covalent polymer network of claim 1, wherein said macro-polyacrylate has the general formula (IIa):

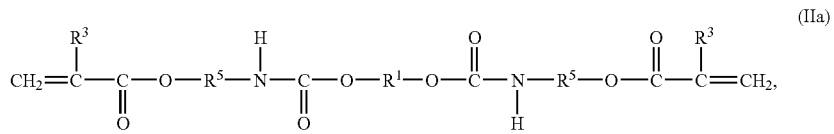

wherein $R^1$, $R^3$ and $R^5$ have the same meaning as defined for formula (II).

6. The covalent polymer network of claim 1, wherein said diacrylate derives from a hydroxyalkyl methacrylate.

7. The covalent polymer network of claim 1, wherein said macro-polyacrylate further comprises a structural unit of polyester polyols that are prepared by at least one of a ring opening polymerization of cyclic lactones and by polycondensation of polycarboxylic acid, polyhydroxycarboxylic acid, hydroxy polycarboxylic acid, or polyhydroxy polycarboxylic acid and polyhydroxy compounds.

8. The covalent polymer network of claim 1, wherein said macro-polyacrylate has an average molecular weight ($M_n$) from 1,000 to 50,000.

9. The covalent polymer network of claim 1, wherein said covalent polymer network is degradable.

10. The covalent polymer network of claim 1, wherein the network is biocompatible.

11. An article for use in the medical field comprising the covalent polymer networks of claim 1.

12. The article of claim 11, wherein the article is an implant material for vascular or non-vascular applications.

13. The covalent polymer network of claim 1, wherein said macro-diol or macro-polydiol is selected from diols and polyols of polyesters, diols and polyols of polyethers, and diols and polyols of polycarbonates.

* * * * *